US012679699B2

(12) United States Patent
Sefcsik et al.

(10) Patent No.: US 12,679,699 B2
(45) Date of Patent: Jul. 14, 2026

(54) SUPPORT STRUCTURE COMPRISING AN ALIGNMENT DEVICE FOR SUPPORT STRUCTURE SECTION CONNECTION REGIONS

(71) Applicant: Inventio AG, Hergiswil (CH)

(72) Inventors: Peter Sefcsik, Györ (HU); Christoph Makovec, Wiener Neustadt (AT); Gerhard Kleewein, Pressbaum (AT)

(73) Assignee: Inventio AG, Hergiswil (CH)

( * ) Notice: Subject to any disclaimer, the term of this patent is extended or adjusted under 35 U.S.C. 154(b) by 47 days.

(21) Appl. No.: 18/865,967

(22) PCT Filed: Jun. 27, 2023

(86) PCT No.: PCT/EP2023/067400
§ 371 (c)(1),
(2) Date: Nov. 14, 2024

(87) PCT Pub. No.: WO2024/008508
PCT Pub. Date: Jan. 11, 2024

(65) Prior Publication Data

US 2025/0136415 A1 May 1, 2025

(30) Foreign Application Priority Data

Jul. 5, 2022 (EP) .................................... 22182968

(51) Int. Cl.
*B66B 23/00* (2006.01)

(52) U.S. Cl.
CPC .................................... *B66B 23/00* (2013.01)

(58) Field of Classification Search
CPC ...................................................... B66B 23/00
USPC .......................................................... 198/321
See application file for complete search history.

(56) References Cited

U.S. PATENT DOCUMENTS 10,760,261 B2 * 9/2020 Richards .................. E04C 3/06
11,913,215 B2 * 2/2024 Krampl ................. E04B 1/2403

FOREIGN PATENT DOCUMENTS

| | | | |
|---|---|---|---|
| CN | 201211997 Y | | 3/2009 |
| EP | 1074507 | * | 2/2001 |
| EP | 4353656 | * | 4/2024 |
| FI | 4353650 | * | 12/2025 |

(Continued)

OTHER PUBLICATIONS

Product Catalog, Nov. 2022 (Nov. 20, 2022) https://www.scholz-mechanik.de/media/pdf/e8/71/f4/SM-Katalog-30-2022-11-20.pdf.

(Continued)

*Primary Examiner* — Gene O Crawford
*Assistant Examiner* — Lester Ill Rushin
(74) *Attorney, Agent, or Firm* — Knobbe, Martens, Olson & Bear, LLP

(57) ABSTRACT

The disclosure relates to a support structure of a passenger transport system which is designed an escalator or moving walkway and comprises an alignment device for two support structure sections of the support structure to be connected to one another. The alignment device comprises a first alignment part comprising a fastening region and a recess, and a second alignment part comprising a fastening region and a projection, wherein a contour of the projection is complementary to a contour of the recess. The projection and/or the recess also have a V-shape.

20 Claims, 2 Drawing Sheets

(56) References Cited

FOREIGN PATENT DOCUMENTS

| | | | |
|---|---|---|---|
| JP | 2006-232489 | A | 9/2006 |
| JP | 4694859 | B2 | 6/2011 |
| JP | 2013-193843 | A | 9/2013 |
| JP | 2014-156353 | A | 8/2014 |
| WO | WO 2020/173753 | A2 | 9/2020 |

OTHER PUBLICATIONS

International Search Report issued in application No. PCT/EP2023/067400 on Sep. 1, 2023.

* cited by examiner

SUPPORT STRUCTURE COMPRISING AN ALIGNMENT DEVICE FOR SUPPORT STRUCTURE SECTION CONNECTION REGIONS

TECHNICAL FIELD

The present disclosure relates to a passenger transport system which is designed as an escalator or moving walkway and can be divided into sections for the purpose of transport and assembly. In particular, the present disclosure relates to the design of a connection region of support structure sections of a support structure of such a passenger transport system.

SUMMARY

Passenger transport systems of the aforementioned type are used to transport passengers between different levels or within a constant level—for example, in buildings. Escalators, which are also referred to as moving stairs, are used, for example, to transport passengers in a building from one floor to another floor. Moving walkways can be used to transport passengers within a floor on a horizontal plane or between two floors on a moderately inclined plane.

Passenger transport systems generally have a support structure, which serves as a load-bearing structure. Such support structures are usually constructed as truss constructions with steel profiles. Due to the availability of modern production equipment such as laser cutting machines and large bending presses, the support structures can also be manufactured as sheet metal constructions. The support structure is designed to absorb static and dynamic forces acting upon the passenger transport system, such as weight forces of transported passengers, forces caused by a drive of the passenger transport system, and the like, and to support such forces on structures of the building that accommodate the passenger transport system. For this purpose, the passenger transport system can be mounted and fastened to the building at suitably formed support points. Depending upon the area of use, the support structure can extend, for example, over two or more levels or floors of the building and/or over shorter or longer distances within a constant floor in the building.

A support structure supported in the assembled state at the support points of the building can accommodate both movable and stationary components of the passenger transport system. Depending upon the configuration of the passenger transport system as an escalator or moving walkway, such components can be formed, for example, as a step band, pallet band, deflection shafts, drive shafts, drive motor, transmission, control, monitoring system, security system, balustrades, comb plates, bearing points, conveyor belt, and/or guide rails.

A support structure is generally composed of a plurality of interconnected, load-bearing support structure components. Such support structure components can comprise, for example, so-called upper chords and lower chords as well as connecting struts connecting these chords to one another, such as cross-struts, diagonal struts, uprights, and the like. Additional structures such as gusset plates, angle plates, retaining plates, floor plates, bottom view plates, etc., can also be provided.

In order to ensure sufficient stability and load-bearing capacity of the support structure, the individual support structure components must be connected to one another with sufficient stability. Usually, the support structure components are welded or riveted together for this purpose.

Depending upon the location, an escalator or moving walkway can have a considerable conveying length of 30 meters or more. However, these long passenger transport systems, and in particular their support structures, can no longer be transported in one piece from the place of manufacture to the place of use. Such a support structure therefore usually consists of at least two support structure sections that can be connected to one another via a connection region. The connection region disclosed in WO 2020 173753 A2 has connecting plates that are welded to the end faces of the upper chord and the lower chord of a supporting structure section, which plates are provided with screw holes. Usually, such support structure sections are already equipped with all other components of the passenger transport system at the manufacturer's factory. The sections created in this way are then packaged for transport and transported to the intended installation site in a building. At the installation site, the sections need only to be connected to one another in the correct order, in order to create a ready-to-use passenger transport system.

Installing the passenger transport system, which is divided into sections, in a building requires qualified assembly personnel who work with precision. JP 2006232489 A describes a corresponding assembly method of an escalator in a subway shaft. This involves inserting the sections into the subway shaft, section by section, connecting them to one another, and anchoring them in the building. Due to the considerable weight of the individual sections and the structural specifications of the shaft, joining together two sections is very time-consuming and labor-intensive, since the connection regions of adjacent sections to be joined must be precisely aligned relative to one another before they can be connected to one another—for example, with connecting screws.

JP2013193843A discloses support structure sections whose connection region is equipped with alignment devices in the region of the support walls. These alignment devices are formed by plates welded on their end faces, wherein one of the plates has a hole, and the other plate has a conical bolt that can engage in the hole. The disadvantage of this solution is that, due to the given space conditions and the required strength, the conical bolt can have only a low conicity and therefore also only allows automatic fine adjustment upon joining. In addition, upon the joining of the support structure sections, the bolt and the hole are difficult to see, so that a lot of time, personnel, and skill still have to be spent on aligning the support structure sections.

The object of the present disclosure is to minimize the alignment work required during the assembly of a passenger transport system that is divided into sections and to simplify the assembly to such an extent that it can also be carried out by less qualified assembly personnel.

This object can be achieved by a support structure of a passenger transport system which is designed as an escalator or a moving walkway and comprises at least a first support structure section and a second support structure section. The two support structure sections can be connected to one another with a connection region formed on their end faces. At least one alignment device can be permanently or, at least during the assembly process, temporarily arranged in the connection region. The alignment device can comprise a first alignment part comprising a fastening region and a recess, along with a second alignment part comprising a fastening region and a projection. A contour of the projection can be configured to be complementary to a contour of the recess, wherein the contour of the projection and/or the recess has a V-shape. The support structure sections in each case can have two support walls arranged in parallel planes, and at least two cross-struts. The support walls can be firmly connected to one another by the cross-struts, so that the support structure sections have an H-shaped cross-section. The support structure sections can also be supplemented with a floor structure, so that their H-shaped cross-section can be supplemented to form a U-shaped cross-section.

As collected assembly experiences show, the alignment of the support structure sections in a lateral direction relative to one another repeatedly can lead to considerable difficulties. In order to overcome these difficulties, the V-shape of the projection or recess of at least one alignment device can be arranged to lie in a directional plane that extends orthogonally to the support walls and between such support walls.

In other words, the alignment device can be installed permanently or temporarily in a support structure of a passenger transport system configured as an escalator or moving walkway, before the installation of the passenger transport system in the building takes place. At least one alignment device can be arranged in at least one of the connection regions, preferably in each connection region, wherein the two alignment parts of an alignment device can be divided in each case between the two support structure sections to be connected to one another.

As already mentioned, the V-shape of the projection and/or the recess can be arranged to lie in a directional plane that extends orthogonally to the support walls and between such support walls. Due to this configuration, the support structure sections can be "automatically" aligned relative to one another in a lateral direction upon joining by the alignment device so that there is no longer any offset of the support structure sections. If necessary, alignment work vertical to the directional plane between the two support structure sections can still be carried out.

In other words, the position of the V-shape or the directional plane within the support structure sections can determine in which direction the support structure sections are aligned by the alignment device. This direction can lie in the aforementioned directional plane and can be orthogonal to the axis of symmetry of the V-shape.

In preparation for assembly, at least one first alignment part can, with its fastening region, be arranged in a stationary manner in the connection region on the first support structure section. The axis of symmetry of the recess can extend parallel to the central longitudinal axis of the support structure section. In the connection region of the second support structure section, at least one second alignment part can be arranged in a stationary manner with its fastening region, wherein the axis of symmetry of the projection can also extend parallel to the central longitudinal axis of the support structure section. According to the present disclosure, the first and the second alignment parts can be aligned arranged in the connection region relative to one another in such a way that, in the assembled state, the support walls of the support structure sections may be precisely aligned to one another as a result of the interlocking of the projection and the recess.

An example arrangement in which the alignment device is very clearly visible to the assembly personnel is that it can be arranged on cross-struts, arranged in the connection region, of two support structure sections. Depending upon the space required for the alignment device, it can easily remain in the support structure. However, the alignment devices can also be removed again after the two support structure sections have been connected if, for example, they are in the way of movable components of the passenger transport system.

If two support structure sections, which are provided with an alignment device, are pushed against one another during the installation of the passenger transport system in the building, the projection can increasingly engage in the recess. Due to the design of the recess and projection, the two support structure sections can be aligned relative to one another with high precision in the directional plane. This is important, since the rail joints of the guide rails of the step conveyor or pallet conveyor that are fastened in the factory in the sections can be precisely aligned relative to one another. As soon as the support structure modules are arranged adjacent to one another in the building, fastening elements such as connecting screws, rivets, and the like can easily be installed in the holes provided in the connection region, without comprising to carry out lengthy alignment work.

The observations during assembly mentioned herein have also shown that, due to the lifting equipment and assembly tools that can be used, a lateral offset of up to 5% of the support structure width can usually be expected upon joining together support structure sections. Preferably, therefore, the alignment device may have a ratio of the width of a base of the V-shape to a support structure width of the support structure provided therefor which is in the range of 1:20 to 1:40.

Preferably, the V-shape can be configured to be mirror-symmetrical to a central longitudinal axis of the alignment part, since the offset that occurs upon joining together support structure modules may be arbitrary and therefore may not always occur in the same direction. The fastening region of the respective alignment part can be configured according to the application requirements and can, for example, have holes for receiving screws, rivets, pins, and the like. Contours of the fastening region can also be designed in such a way that the alignment part can be easily welded, soldered, or glued to a component of the support structure section. The fastening region can also have clamping devices such as clamping claws, clamping brackets, and the like, in order to fasten the alignment part to parts of the support structure section so as to be secured against displacement.

The first alignment part and the second alignment part can be machined from a plate material. Due to the plate-shaped design, the space requirement may be very small, which is why alignment parts arranged on cross-struts can be left in the installed, ready-to-use escalator or moving walkway. The projection or recess can be formed by the machined contour of the respective alignment part. The production of such an alignment device can be particularly economical and can save material if the two alignment parts are cut out of the plate material in one operation with a laser cutting system or water jet cutting system. Of course, other processing methods such as milling or sawing can also be used. Different shape combinations are conceivable within an alignment device. For example, both the projection and the recess can have a V-shape. Another possibility is that the recess can be designed in a prism shape and thus can have a V-shape, and the projection can be designed in a semi-cylindrical shape. Complementary contours can mean that the half-cylinder of the projection fits precisely into the prism of the recess, so that, after joining together the support structure sections equipped with it, the surfaces of the projection touch the surfaces of the recess, but are not pressed against one another with great force. It is also conceivable that the projection may have a V-shape, and the recess may be configured as a rectangular groove. However, this solution can cause problems upon joining, since, due to the sharp corners of the groove, there may be only a linear contact between the projection and the recess.

The V-shape of the projection or recess can have flanks that can be arranged at a predetermined flank angle relative to one another. The flank angle can be selected in the range between 10° and 140°, preferably between 60° and 100°, and particularly preferably between 60° and 90°.

The support structure sections can in each case be provided with a floor plate to retain lubricant and dirt deposits that occur within the passenger transport system. In the connection region of two support structure sections, an edge region of one of the two floor plates adjacent to one another can protrude beyond the two support walls, wherein this protruding edge region can be provided with a double bevel with an inclined flank surface, in order to ensure an overlap of the two floor plates. The inclined flank surface can also be adapted to the alignment device and interact with it so that, upon the connection of two support structure sections, the lateral offset can be aligned by the alignment device, and the vertical offset can be aligned by the inclined flank surface.

BRIEF DESCRIPTION OF THE DRAWINGS

Preferred exemplary embodiments of the present disclosure are explained in more detail herein and in the accompanying drawings, wherein corresponding elements are provided with the same reference signs in all figures. Neither the drawings nor the description are to be interpreted as limiting the disclosure. In the drawings.

DETAILED DESCRIPTION

Figure 1:
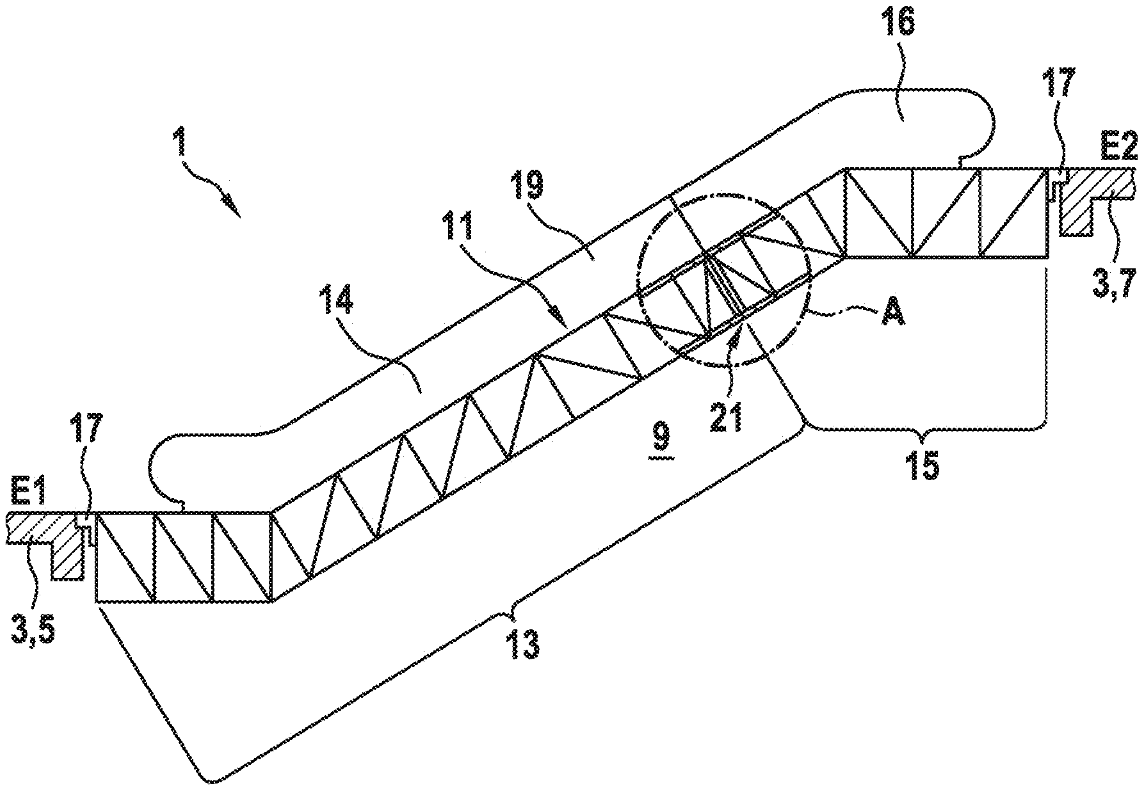
FIG. 1 is a schematic side view of a passenger transport system with a support structure, which is composed of two support structure sections which are firmly connected to one another by a connection region.

FIG. 1 shows schematically in a side view a passenger transport system 1 that is configured as an escalator or moving walkway and connects a first floor level E1 to a second floor level E2 of a building 3. The passenger transport system 1 comprises a support structure 11 composed of two support structure sections 13, 15. The support structure 11 is supported on the floors 5, 7 of the floor levels E1, E2 of the building 3 via two support brackets 17 arranged at the end face and spans the intermediate space 9 between the floor levels E1, E2 like a bridge.

The two support structure sections 13, 15 of the support structure 11 are connected to one another at point A by a connection region 21. Detachable fasteners such as high-strength connecting screws can be used to connect two supporting structure sections 13, 15. It is possible to divide the support structure 11 into more than two support structure sections 13, 15, wherein the number of connection regions 21 is thereby increased. As indicated, the support structure 11 shown is a truss construction, which can comprise of welded steel profiles or may have been machined from sheet metal plates.

As shown schematically by the balustrade 19, the supporting structure 11 may accept the load of all the other components of the passenger transport system 1 and can support them on the building 3. The passenger transport system 1 can be completely assembled and tested at the manufacturer's factory and then separated in the connection regions 21. The sections 14, 16 created in this way can then be packaged for transport and transported to the intended installation site. At the installation site, the sections 14, 16 may still need to be connected to one another in the correct order, in order to create a ready-to-use passenger transport system 1.

Figure 2:
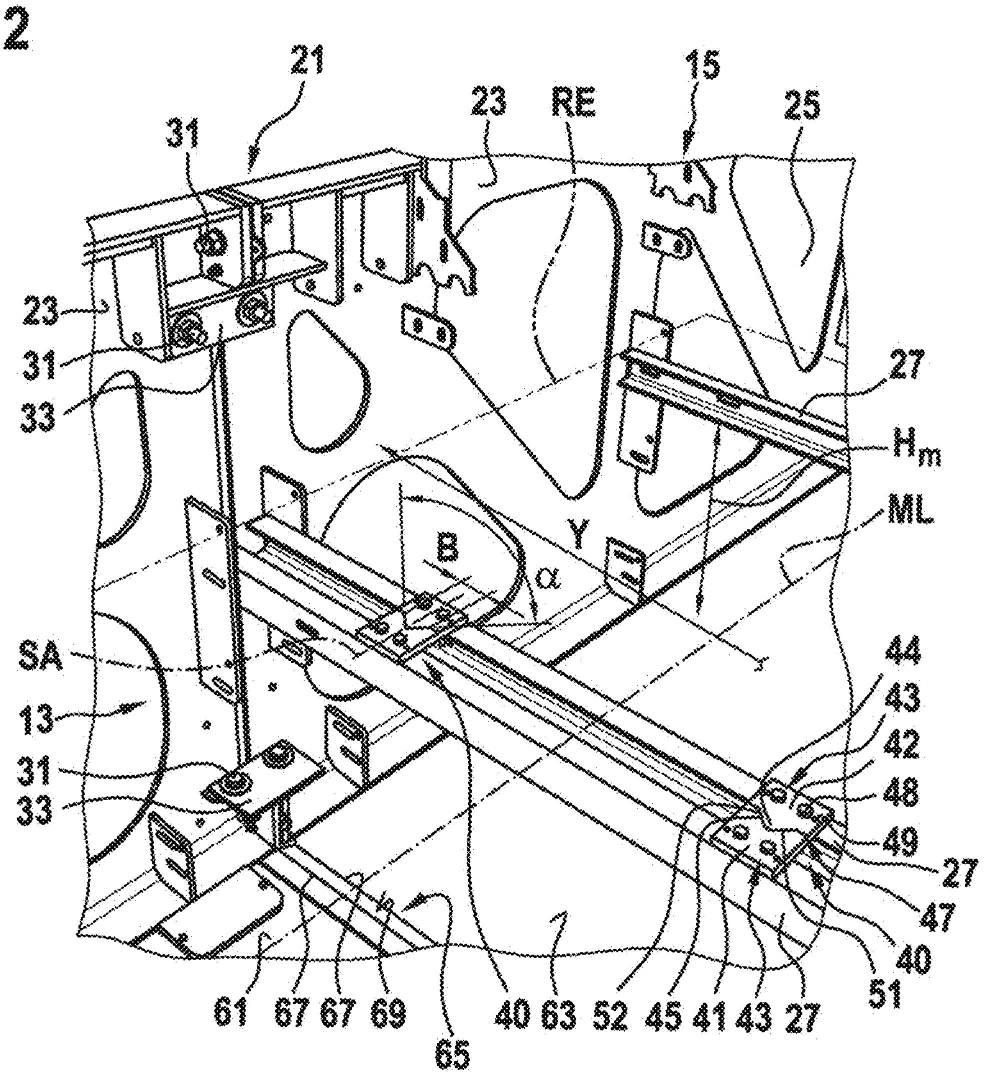
FIG. 2 is an enlarged, three-dimensional representation of the point A of the connection region indicated in FIG. 1, with two alignment devices arranged in the connection region.

FIG. 2 shows an enlarged, three-dimensional representation of the point A indicated in FIG. 1 of the connection region 21 of the two support structure sections 13, 15. Each of the support structure sections 13, 15 in each case can comprise two support walls 23 arranged in planes parallel to one another. In FIG. 2, only one of the two support walls 23 is shown in each case for each support structure section 13, 15, in order to better show an interior space 25, delimited by such walls, of the support structure sections. A central longitudinal axis ML of the support structure sections 13, 15 is intended to additionally illustrate that, with each support structure section 13, 15, a second support wall 23 that is mirror-symmetrical to the first support wall 23 can be present. These two support walls 23 may be firmly connected to one another at their middle height Hm by cross-struts 27, so that each of the support structure sections 13, 15 can have an H-shaped cross-section. The two support structure sections 13, 15 can be firmly connected to one another in the connection region 21 with a fastener such as the connecting screws 31 and connecting plates 33 shown.

Furthermore, two alignment devices 40 are arranged in the connection region 21. Each of the alignment devices 40 comprises a first alignment part 41 comprising a fastening region 43 and a recess 45, and a second alignment part 42 comprising a fastening region 43 and a projection 44. A contour 47 of the projection 44 can be configured to be complementary to a contour 47 of the recess 45, wherein both contours have a V-shape.

As shown by way of example in FIG. 2, the two first alignment parts 41 are arranged with their fastening region 43 in a stationary manner in the connection region 21 on a cross-strut 27 of the first support structure section 13. Here, an axis of symmetry SA of the V-shaped recess 45 extends parallel to the central longitudinal axis ML or to the longitudinal extension of the first support structure section 13. In an analogous manner, the two second alignment parts 42 are arranged with their fastening region 43 in a stationary manner in the connection region 21 on a cross-strut 27 of the second support structure section 15. Here, the first alignment parts 41 and the second alignment parts 42 are aligned relative to one another in the connection region 21 in such a way that, in the assembled state, the support walls 23 of the support structure sections 13, 15 may be precisely aligned with one another as a result of the interlocking of the V-shaped projection 44 and the V-shaped recess 45. The V-shape of the projection 44 and the recess 45 can be arranged to lie in a directional plane RE that extends orthogonally to the support walls 23 and between such support walls 23. Due to this arrangement, upon joining together the support structure sections 13, 15, the support walls 23 may align themselves "automatically" relative to one another. This may be possible if the projection 44 also meets the recess 45. Experience shows that a lateral offset of the support walls 23 of two support structure sections 13, 15 upon joining with assembly devices such as hoists, cable winches, and the like is not particularly large, but is always present. Preferably, a width B of a base of the V-shape relative to a structural width Y of the support structure 11 should be in a range of 1:20 to 1:40.

The two alignment devices 40 shown in FIG. 2 can be made of a plate material. The alignment parts 41, 42 of the alignment device 40 can be cut out of a steel plate with a laser cutting system, for example, or from a high-strength polymer plate with a water jet cutting system. The fastening regions 43 can be provided with through-holes, which in FIG. 2 are covered by screws 48. In the cross-struts 27, there can be threaded holes (not visible), into which the screws 48 are tightened.

In order to attain a precise alignment of the alignment parts 41, 42 on the cross-struts 27, the alignment devices 40 can be mounted in the connection regions 21 after the complete assembly of the passenger transport system 1 at the manufacturer's factory. For this purpose, the alignment devices 40 can be fastened to the cross-struts 27 with the screws 48, wherein care can be taken to ensure that the projection 44 is precisely arranged in the recess 45 in each case. This can be the case if the flanks 51, 52, which form the V-shape of the V-shaped projection 44 or the V-shaped recess 45, respectively, abut against one another. In the present exemplary embodiment, the flanks 51, 52 are arranged at a flank angle $\alpha$ of 90° relative to one another, but this can also be chosen to be more obtuse or more acute. After tightening the screws 48, through-holes can be drilled for dowel pins 49, and dowel pins 49 can be pressed into the holes. The completed passenger transport system 1 can then be disassembled into sections at the manufacturer's factory by removing the connecting screws 31 and connecting plates 33 in the connection regions 21.

As FIG. 2 also shows, the support structure sections 13, 15 can be in each case provided with a floor plate 61, 63, wherein, in the connection region 21 of two support structure sections 13, 15, an edge region 65 of one of the two floor plates 13, 15 adjacent to one another can protrude beyond the two support walls 23. This projecting edge region 65 can be provided with a double bevel 67 with an inclined flank surface 69, in order to ensure an overlap of the two floor plates 61, 63.

Although the present disclosure has been described by illustrating specific exemplary embodiments, it is obvious that numerous further embodiments can be created with knowledge of the present disclosure, e.g., by arranging on the cross-struts 27 a plurality of alignment devices 40, which, due to their specific arrangement, enable not only lateral but also vertical alignment. Here, the V-shape of some alignment parts 41, 42 is arranged in the directional plane RE, and the V-shape of further alignment parts 41, 42 is arranged in a plane parallel to the support walls 23.

The invention claimed is:

1. A support structure of a passenger transport system, which is configured as an escalator or moving walkway, the support structure comprising:

a first support structure section and a second support structure section, wherein the first support structure section and the second support structure section each comprise:

two support walls arranged in parallel planes, and at least two cross-struts configured to connect the support walls, a connection region connecting an end of the first support structure section and an end of the second support structure, wherein the connection region comprises at least one alignment device comprising:

a first alignment part comprising a first fastening region and a recess, and a second alignment part comprising a second fastening region and a projection, wherein a contour of the projection is configured to interlock with a contour of the recess, and wherein the contour of the projection or the contour of the recess each have a V-shape arranged to lie in a directional plane that extends orthogonally to the two support walls and between the two support walls.

2. The support structure of claim 1, wherein:

in the connection region on the end of the first support structure section, at least one of the first alignment parts is fixed with the first fastening region to the at least two cross-struts and an axis of symmetry of the recess extends parallel to a central longitudinal axis of the support structure sections, in the connection region on the end of the second support structure section, at least one of the second alignment parts is fixed with the second fastening region to the at least two cross-struts and an axis of symmetry of the projection extends parallel to the central longitudinal axis of the support structure section, the first alignment part and the second alignment part are arranged in the connection region relative to one another such that, in an assembled state of the support structure, the support walls of the support structure sections are aligned relative to one another as a result of the interlocking of the contour of the projection and the contour of the recess.

3. The support structure of claim 1, wherein the at least one alignment device is arranged on the at least two cross-struts of the support structure sections.

4. The support structure of claim 2, wherein the at least one alignment device is arranged on the at least two cross-struts of the support structure sections.

5. The support structure of claim 1, wherein the support structure sections adjoining one another are firmly connected to one another in the connection region with connecting screws and connecting plates.

6. The support structure of claim 2, wherein the support structure sections adjoining one another are firmly connected to one another in the connection region with connecting screws and connecting plates.

7. The support structure of claim 3, wherein the support structure sections adjoining one another are firmly connected to one another in the connection region with connecting screws and connecting plates.

8. The support structure of claim 1, wherein a ratio of a width of a base of the V-shape to a support structure width is in the range of 1:20 to 1:40.

9. The support structure of claim 2, wherein a ratio of a width of a base of the V-shape to a support structure width is in the range of 1:20 to 1:40.

10. The support structure of claim 3, wherein a ratio of a width of a base of the V-shape to a support structure width is in the range of 1:20 to 1:40.

11. The support structure of claim 5, wherein a ratio of a width of a base of the V-shape to a support structure width is in the range of 1:20 to 1:40.

12. The support structure of claim 1, wherein the two support structure sections each further comprise a floor plate, and, in the connection region of the two support structure sections, an edge region of one of the two floor plates protrudes beyond the two support walls, wherein the edge region comprises a double bevel with an inclined flank surface configured to ensure an overlap of the two floor plates.

13. The support structure of claim 2, wherein the two support structure sections each further comprise a floor plate, and, in the connection region of the two support structure sections, an edge region of one of the two floor plates protrudes beyond the two support walls, wherein the edge region comprises a double bevel with an inclined flank surface configured to ensure an overlap of the two floor plates.

14. The support structure of claim 1, wherein the first alignment part and the second alignment part are machined from a plate material and wherein the projection or the recess is formed by a machined contour of the respective alignment part.

15. The support structure of claim 2, wherein the first alignment part and the second alignment part are machined from a plate material and wherein the projection or the recess is formed by a machined contour of the respective alignment part.

16. The support structure of claim 14, wherein the V-shape of the projection or the recess comprises flanks which are arranged at a flank angle relative to one another, wherein the flank angle is in the range between 10° to 140°.

17. The support structure of claim 15, wherein the V-shape of the projection or the recess comprises flanks which are arranged at a flank angle relative to one another, wherein the flank angle is in the range between 10° to 140°.

18. A passenger transport system that is configured as an escalator or moving walkway and can be divided into sections, comprising the support structure of claim 1.

19. A passenger transport system that is configured as an escalator or moving walkway and can be divided into sections, comprising the support structure of claim 2.

20. A passenger transport system that is configured as an escalator or moving walkway and can be divided into sections, comprising the support structure of claim 3.

* * * * *